United States Patent
Silverstein et al.

(10) Patent No.: US 11,622,408 B2
(45) Date of Patent: Apr. 4, 2023

(54) COMMUNICATION PLATFORM CONNECTIVITY MANAGEMENT

(71) Applicant: International Business Machines Corporation, Armonk, NY (US)

(72) Inventors: Zachary A. Silverstein, Austin, TX (US); Jacob Ryan Jepperson, St. Paul, MN (US); Alan Chung, Hopewell Junction, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 17/139,041

(22) Filed: Dec. 31, 2020

(65) Prior Publication Data

US 2022/0210858 A1 Jun. 30, 2022

(51) Int. Cl.
| | | |
|---|---|---|
| H04W 4/00 | (2018.01) | |
| H04W 76/25 | (2018.01) | |
| H04W 48/16 | (2009.01) | |
| H04W 68/00 | (2009.01) | |
| H04W 76/14 | (2018.01) | |

(52) U.S. Cl.
CPC .......... *H04W 76/25* (2018.02); *H04W 48/16* (2013.01); *H04W 68/005* (2013.01); *H04W 76/14* (2018.02)

(58) Field of Classification Search
CPC ... H04W 76/25; H04W 48/16; H04W 68/005; H04W 76/14; H04W 68/00
USPC .................................................. 370/329, 435
See application file for complete search history.

(56) References Cited

U.S. PATENT DOCUMENTS

| | | | |
|---|---|---|---|
| 8,689,058 B2 | 4/2014 | Thimmappa | |
| 2006/0036695 A1 | 2/2006 | Rolnik | |
| 2008/0155454 A1 | 6/2008 | Balasubramanian | |
| 2015/0127712 A1* | 5/2015 | Fadell | H04L 12/2807 709/202 |
| 2015/0295808 A1* | 10/2015 | O'Malley | H04L 43/10 709/224 |
| 2015/0365217 A1* | 12/2015 | Scholten | H04L 5/0053 370/315 |
| 2016/0072891 A1* | 3/2016 | Joshi | G06Q 30/0641 370/254 |
| 2017/0099592 A1 | 4/2017 | Loeb | |
| 2019/0278646 A1 | 9/2019 | Fernandez | |
| 2020/0151620 A1* | 5/2020 | Chao | G06N 7/005 |
| 2020/0153765 A1* | 5/2020 | Burbank | H04L 51/046 |
| 2020/0153934 A1* | 5/2020 | Burbank | H04L 41/0893 |
| 2021/0150374 A1* | 5/2021 | Bastide | H04L 51/046 |
| 2021/0241134 A1* | 8/2021 | Burbank | G06F 16/24568 |

(Continued)

OTHER PUBLICATIONS

"IT Outages Notification Solution," DeskAlerts.com, accessed Mar. 9, 2020, 5 pages. <https://www.alert-software.com/it-outage>.

(Continued)

*Primary Examiner* — Marceau Milord
(74) *Attorney, Agent, or Firm* — Brian D. Welle

(57) ABSTRACT

A connectivity state of a communication platform on a plurality of user devices is identified. The plurality of user devices includes a first and second user device. A message from the first user device that is directed to the second user device regarding the connectivity state is detected. In response to detecting the message, an indication of the connectivity state is provided to the first user device.

7 Claims, 3 Drawing Sheets

(56) References Cited

U.S. PATENT DOCUMENTS

2021/0241162 A1* 8/2021 Asadorian ................ G06N 5/04
2021/0374391 A1* 12/2021 Jorasch ................. G06V 40/10

OTHER PUBLICATIONS

Anonymous, "Methods Implemented to Effectively Manage Application Outages in Cloud Promoting Provider New Offerings," IP.com, Disclosure No. IPCOM000250601D, Aug. 8, 2017, 4 pages. <https://priorart.ip.com/IPCOM/000250601>.

Anonymous, "System and Method to Manage, Notify Interdependent Servers/Systems Availability" IP.com, Disclosure No. IPCOM000257290D, Jan. 30, 2019, 5 pages. <hhttps://priorart.ip.com/IPCOM/000257290>.

* cited by examiner

COMMUNICATION PLATFORM CONNECTIVITY MANAGEMENT

BACKGROUND

It is increasingly common that organizations may have numerous communication platforms across which members of these organizations communicate. For example, employees of a business may communicate using an email communication platform, one or more instant messaging communication platforms, social media communication platforms, or the like. Occasionally, one or more users may have difficulty connecting to one or more of these communication platforms as a result of a connectivity state of one or more of these communication platforms. For example, one or more of these communication platforms may be failing on one or more networks, or may be failing for one or more computers, or the like

SUMMARY

Aspects of the present disclosure relate to a method, system, and computer program product relating to managing the connectivity of a plurality of user devices to a plurality of communication platforms. For example, the method includes identifying a connectivity state of a communication platform on a plurality of user devices. The plurality of user devices includes a first and second user device. The method further includes detecting a message from the first user device and directed to the second user device. The message regards the connectivity state. The method also includes providing, to the first user device in response to detecting the message, an indication of the connectivity state. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
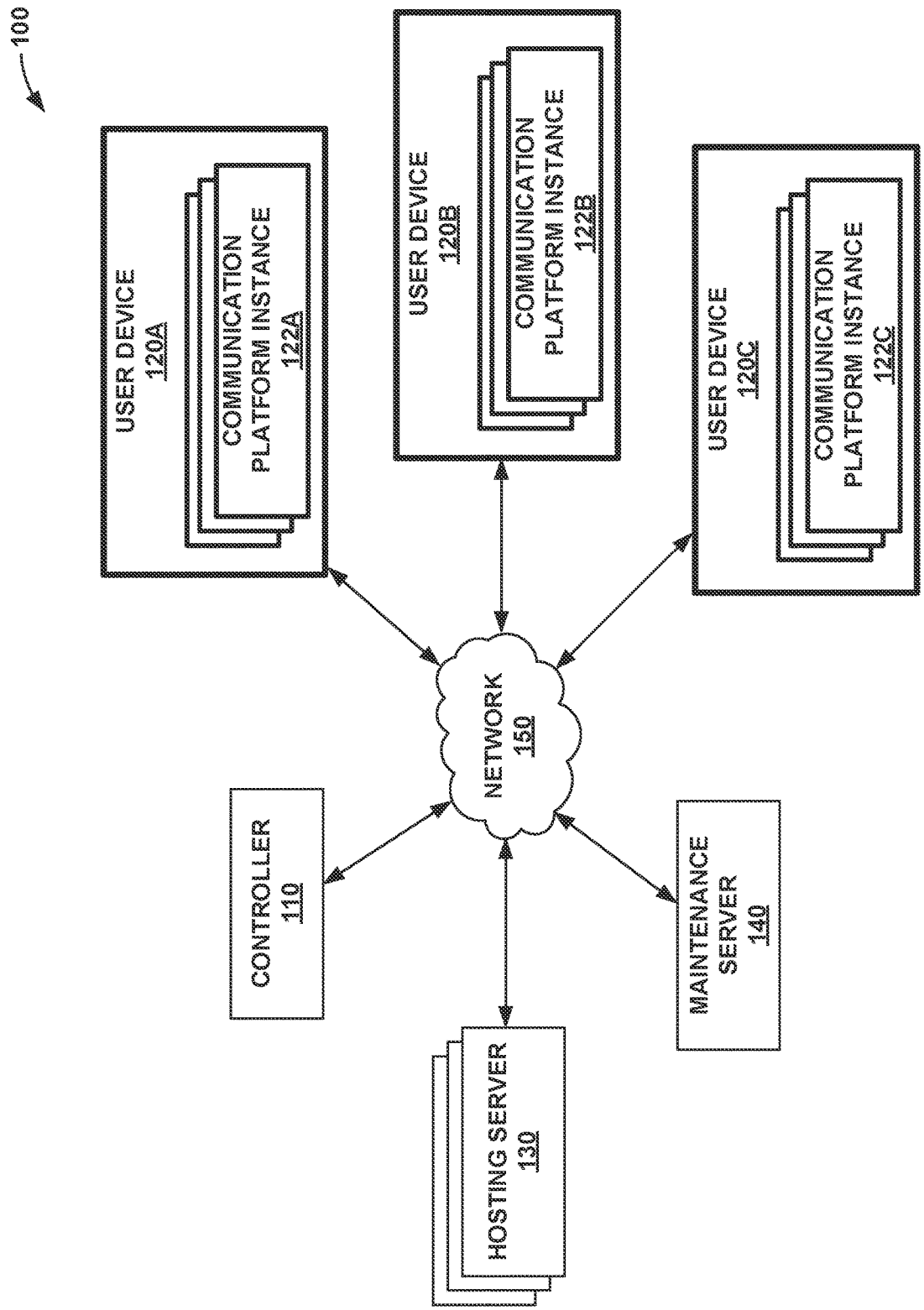
FIG. 1 depicts a conceptual diagram of an example system in which a controller may manage connectivity of a plurality of user devices to one or more communication platforms.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing connectivity to communication platforms, while more particular aspects of the present disclosure relate to providing connectivity state indications to a first user in response to detecting that the first user is messaging a second user regarding this connectivity state. While the present disclosure is not necessarily limited to such applications, various aspects of the disclosure may be appreciated through a discussion of various examples using this context.

Members (or users) of modern organizations typically rely upon a plurality of communication platforms to perform their roles within their organizations. For example, an organization may include a substantial number of users (e.g., dozens of users, hundreds of users, thousands of users, etc.) that communicate across a predetermined set of communication platforms such as email platforms, instant messaging platforms, social media platforms, short message service (SMS) platforms, or the like. Using a plurality of communication platforms may provide some redundancy for organizations, such that if one communication platform has an outage, users may still use another communication platform to communicate. At some point one or more communication platforms used by the organization may experience an outage of some period of time for some users. This outage may include a communication platform on some computers being unable to receive or transmit, or experiencing delays such that some or all communication takes substantially longer to transmit than as is typical, or other types of communication outages. These outages may relate to (e.g., be experienced by) all computers (and therein all users) of an organization. In other examples, these outages may relate to a smaller subset of computers (and therein a smaller subset of users) of the organization.

Users of these communication platforms may only become aware of the possibility of such outages in response to these users directly experiencing these outages. For example, a first user may repeatedly attempt to use a communication platform to communicate to a second user and identify an outage of this communication platform via repeatedly receiving an error from the communication platform (or unexpectedly receiving no reply from the second user who is typically highly responsive, or the like). In this situation, it may be difficult or impossible for the first user to actually confirm either the existence or the scope of the outage. Specifically, it may be difficult or impossible for the first user to know if there is an outage, if the computer of the first user (or second user) is malfunctioning, if an outage is being experienced only by the first user (or only by the second user, or both) or by a larger group of users, if the outage is confined to the current communication platform or if a plurality of communication platforms are affected, or the like.

Whether or not an outage exists and/or is sufficiently widespread, users attempting to message each other regarding this potential may substantially harm productivity of the organization. For example, a question as to whether or not there is an outage may consume the attention of an increasing group of users for a number of consecutive minutes as each of these users attempt to qualify and quantify the existence of this outage (and therein message other users attempting to do so). In addition to wasting man-hours, such an outage question may cause the users to consume unnecessary amount of a network bandwidth as these users send messages back and forth across a network to attempt to confirm the existence of an outage and/or determine the outer bounds of this outage.

In some examples, an organization may utilize a conventional maintenance platform to manage connectivity states such as outages of the communication platform. The conventional maintenance platform may include services offered by the providers of the communication platform, an internal department (e.g., an information technology (IT) department) of the organization, an automated service, or the like. In some examples, this conventional maintenance platform may attempt to "get ahead of" such outages by sending automated messages to users, such that the conventional maintenance platform will send a preemptive automated message to users as soon as the conventional maintenance platform detects the outage (which may be before the user is aware of this outage). For example, the conventional maintenance platform may send a message on an alternative communication platform that is determined to be functional at the time of the outage. Specifically, in response to determining that an instant messaging application is experiencing an outage, a conventional maintenance platform may send an email to users of the organization informing the user of this outage.

However, in some examples, these conventional maintenance platforms may cause more problems than the outage caused. For example, some outages may only last for a few minutes or a few hours, or may occur during non-productive hours, or the like. In such examples, an automated message may cause more confusion than clarity for users that would have otherwise never even known that an outage existed. Further, an automated message that is sent by a conventional maintenance platform to all users of an organization may occupy bandwidth that is better saved for other purposes. In some examples, configuring a conventional maintenance platform to send such emails or notifications for any outage that affects any computer of an organization may cause some users to stop paying attention to emails and/or notifications as many of these emails/notifications do not immediately relate to the user (which may later cause issues if the user does not identify an email and/or notification that does require immediate action, such as a message about a security breach. In this way, conventional maintenance platforms that are configured to send messages in response to any outage may needlessly clog bandwidth, while potentially making users less responsive to any given message provided to these users.

Aspects of this disclosure may solve or otherwise address some or all of these problems of conventional systems. A computing device that includes a processing unit executing instructions stored on a memory may provide the functionality that addresses these problems, this computing device herein referred to as a controller. This controller may be provided by a standalone computing device as predominantly described below for purposes of clarity, though in other examples the controller may be integrated into a maintenance platform and/or into some or all user devices while still providing the functionality described herein. For example, this controller may be configured to detect a connectivity state of communication platforms, and therein provide an indication of this connectivity state to a user only in response to detecting this user sending a message that regards the connectivity state.

Specifically, the controller may have access to a maintenance server or the like that details a connectivity state of one or more communication platforms. Further, the controller may monitor a plurality of users sending messages to each other. The controller may be configured to detect when a first user is asking another user about a connectivity state of a communication platform (e.g., in response to the first user experiencing difficulty sending messages on the communication platform), in response to which the controller provides an indication for the first user that confirms (or denies) the existence of an outage for this communication platform. The controller may provide this indication prior to the first user sending the message to the second user. For example, the controller may detect that text being typed into an input window by the first user relates to the topic of the connectivity state, in response to which the controller provides the indication to the first user. Alternatively, or additionally, the controller may identify the topic of the message as sent by the first user, and the controller may intercept and temporarily hold this message while providing the indication, offering the user the ability to unhold (and therein send) the message if the first user so desires.

In certain examples, the controller may be configured to provide an indication of a connectivity state to a user in response to a user generating a message that the controller determines may be difficult or impossible to transmit because of connectivity problems. For example, the controller may identify an outage of a communication platform that will impact (e.g., slow, or otherwise make impossible) communication between the first user and a second user on this communication platform. The controller may determine to not proactively inform either user until such information becomes necessary or relevant to either user. After this, the controller may determine that the first user is about to send a message to the second user on the impacted communication platform. In response to detecting this message that regards the connectivity state (insofar as the message is impacted by the outage), the controller may provide an indication to the first user with details on this connectivity state outage. By configuring the controller to only provide indications of connectivity states in response to detecting that the users are about to send messages that regard the connectivity state in this way, the controller may improve a bandwidth usage of an organization and also promote more efficient use of man hours within the organization.

For example, FIG. 1 depicts environment 100 in which controller 110 manages connectivity state indications for a plurality of user devices 120A-120C (collectively "user devices 120"). Controller 110 may include a computing device, such as computing system 200 of FIG. 2 that includes a processor communicatively coupled to a memory that includes instructions that, when executed by the processor, causes controller 110 to execute one or more operations described below. User devices 120 may also include computing devices (similar to computing system of FIG. 2), such as a laptop, desktop, tablet, smart phone, or the like.

Controller 110 may manage connectivity of user devices 120 across one or more communication platforms. As discussed herein, the communication platform may be any computer-provided platform across which people may communicate between two (or more) different computing devices. For example, a communication platform may enable two or more users to communicate using text, speech, a video feed, or any other sort of medium. The communication platform may enable one-to-one communication (e.g., a verbal conversation among two participants) or one-to-many communication (e.g., a chat room occupied by three or more people). Communication as provided by communication platforms may be two way (e.g., where both parties may both send and receive messages) or one way (e.g., where only one party may send and/or receive messages).

Users may utilize user devices 120 to receive and send communication over communication platforms over local communication platform instances 122A-122C (collectively, "communication platform instances 122") that are on respective user devices 120. For example, a first user may access communication platform instance 122A on user device 120A to communicate over a given communication platform with a second user that accesses communication platform instance 122B on user device 120B. As depicted, each of user devices 120 may be configured to enable respective users to access a plurality of communication platform instances 122 that each relate to separate communication platforms.

The communication platform may be hosted by one or more hosting servers 130. Hosting servers 130 may be configured to force some or all communication between user devices 120 to travel through hosting server 130. For example, messages between communication platform instances 122 may all be routed through hosting server 130. In other examples, hosting server 130 may provide functionality to communication platform instances 122 that enables these communication platform instances 122 to send communication directly between user devices 120.

User devices 120 may communicate using the communication platform over network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user devices 120, hosting servers 130, and/or maintenance server 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may manage connectivity as described herein.

In some examples, any information on connectivity states relating to an ability of user devices 120 to communicate via communication platform instances 122 may be received and analyzed by maintenance server 140 (e.g., which is the repository of an IT department or the like of an organization of user devices 120). Connectivity state information may include a problem with one or more user devices 120 accessing network 150, accessing one or more hosting servers 130, utilizing local communication platform instances 122, or the like. Controller 110 may determine that an outage exists where a connectivity state issue results in two or more user devices 120 being unable to reliably communicate using respective communication platform instances 122. In some examples, reliably communicating includes substantially 100% of messages being accurately transmitted between user devices 120 within a predetermined threshold response time (e.g., within 1 second, 5 seconds, 1 minute, etc., depending upon the communication platform).

Data on maintenance server 140 may include ongoing support tickets (e.g., where a support ticket includes data sent by a user regarding a potential computer program identified by the user), a list of user devices 120 that are affected, communication platforms that are affected, networks 150 that are affected, or the like. As described above, an IT department may receive this data and store it within maintenance server 140 as the IT department looks to resolve any ongoing connectivity state issues. Additionally, or alternatively, in some examples autonomous programs or artificial intelligence (AI) functionality may store data on maintenance server 140 as these programs and/or AI functionality look to resolve connectivity issues. In some examples, controller 110 may provide some of this AI functionality, and/or controller 110 may be integrated into maintenance server 140 that provides this maintenance functionality, though for purposes of illustration controller 110 is depicted as a separate entity in FIG. 1.

Controller 110 may gather connectivity state data relating to the ability of user devices 120 to access and communicate over communication platform instances 122. In some examples, this connectivity state data may be gathered from maintenance server 140. For example, controller 110 may gather data on all ongoing support tickets or the like. Additionally, or alternatively, controller 110 may gather connectivity state data directly from one or more user devices 120, communication platform instances 122, hosting servers 130, network(s) 150, or the like. For example, controller 110 may utilize a plurality of agents on each of user devices 120, hosting servers 130, network 150 computing devices, or the like that each report connectivity data to controller 110. This connectivity state data may include errors detected by respective agents, response times that exceed predetermined thresholds, unsent (and/or unreceived) messages (or message notifications), or the like.

Controller 110 may detect whether or not there are any ongoing connectivity state outages. In some examples, controller 110 may only detect that there is (or previously was) a connectivity outage as a result of maintenance server 140 including a record of such connectivity outage. In other examples, controller 110 may be configured to itself autonomously detect a connectivity outage via computing agents informing controller 110 of such. For example, in addition to controller 110 detecting errors and failing response times and the like, controller 110 may be configured to have agents on two or more predetermined user devices 120, hosting servers 130, or the like send call-and-response messages back and forth on different predetermined schedules and/or in response to a detected message that regards a connectivity state. In such examples, controller 110 may identify a failure to receive a response from a remote computing agent as an outage.

In some examples, controller 110 may only analyze messages of users after receiving an opt-in from these users. This opt-in may detail what information controller 110 will gather, a purpose for this data gathering, any monetization may result from this gathering, a duration for which this data will be gathered and/or stored, or the like. In some examples, controller 110 may gather data on communication between two users in response to receiving an opt-in from both users. In other examples, a controller 110 may gather some or all data on a conversation in response to one user of the communication providing an opt-in (e.g., controller 110 may gather data from messages that a first user sends to a second user and ignore data that the first user receives from the second user in response to controller 110 having an opt-in from the first user and not the second user).

Controller 110 may gather data as sent by and/or as typed into communication platform instances 122. Controller may be configured to detect when a first user is sending a message that regards a connectivity state. For example, controller 110 may use natural language processing (NLP) techniques to analyze messages being entered into communication platform instances 122 of respective user devices 120. Controller 110 may detect that a message is a message about connectivity states when the topic of the message is determined using NLP techniques to relate to connectivity.

For example, controller 110 may determine that a message of "Hey Jim, I'm having trouble getting a response from Chad over email—can you confirm if our email is working?" as relating a connectivity state for an email communication platform.

In response to detecting this message regarding connectivity states, controller 110 may provide an indication to the user that was entering (e.g., sending, or preparing to send) the message. This indication as provided by controller 110 may effectively answer the message. For example, in response to the message from the first user to user Jim regarding user Chad, controller 110 may identify whether or not there are any connectivity outages for the email communication platform. If there are outages regarding the email communication platform, controller 110 may confirm whether or not these outages would impact an email between the first user and user Chad. If controller 110 determines that there are any connectivity state outages that relate to the communication platform and/or Chad, controller 110 may provide details on these connectivity state outages within an indication to the user. For example, controller 110 may inform the user of the communication platforms that are impacted, user devices 120 that are impacted, aspects of network 150 that are impacted, or the like. Alternatively, if controller 110 determines that there are no connectivity state outages (and rather that there is full connectivity for at least the email communication platform between the first user and Chad), controller 110 may provide an indication that indicates this full connectivity. As used herein, full connectivity may mean that messages between the intended parties are expected to be transmitted 100% of the time within a time limit that is faster than a threshold.

In some examples, where controller 110 determines that there is no connectivity state outages (but instead there is full connectivity), controller 110 may analyze if there is another reason why the first user may have difficulties using the communication platform to contact the respective intended user. For example, controller 110 may analyze settings of the respective user device 120 of the first user (e.g., whether or not the first user has enabled an "airplane mode" regarding the full user device 120 and/or regarding the respective communication platform instance 122), and/or controller 110 may check settings of the respective communication platform instance 122 to see if there is a reason why communication with the intended user has not succeeded (e.g., the intended user has a "sleep" profile as a result of the intended user being away from the computer for a threshold period of time). Where controller 110 is able to detect an issue that impacts this communication, controller 110 may include this issue to the user within the indication that otherwise explains why the communication has be relatively unsuccessful even with the full connectivity.

Controller 110 may provide this indication by causing respective user devices 120 to graphically present the indication within a graphical user interface (GUI) in which the first user is messaging the second user. For example, the graphical indication may include a pop-up window or the like. In other examples, the indication may include an audible indication or any other type of indication.

Controller 110 may provide this indication subsequent to or prior to the user actually sending the message. For example, controller 110 may detect this message as it is typed and immediately provide the indication (e.g., within a pop-up window, otherwise immediately adjacent the input window, or the like) before the user is able to send the message. Alternatively, or additionally, controller 110 may detect that the user is trying to send the message (e.g., by pressing the enter key) and therein providing the indication, so that the user must navigate past the indication prior to sending the message. Configuring controller 110 to provide this indication of connectivity prior to a user messaging a second user regarding connectivity may improve an ability of a system to avoid clogging bandwidth (e.g., clogging bandwidth with connectivity queries) and/or improve an ability of a system to promote productivity of an organization by immediately (or preemptively) answering user questions about connectivity states as (or before) they arise.

In some examples, controller 110 may detect a message that includes text that does not regard a topic of connectivity, but otherwise regards to connectivity as the message will encounter a connectivity outage. For example, controller 110 may detect a message on one of communication platform instances 122 that controller 110 determines will encounter an outage. Controller 110 may detect this outage from relevant records stored on maintenance server 140. Controller 110 and/or maintenance server 140 may determine to not proactively send a notification to all user devices 120 to avoid clogging bandwidth (and/or to avoid the loss of productivity that may occur as a result of a notification that a communication platform is down). For example, controller 110 and/or maintenance server 140 may determine to not proactively send a notification to all user devices 120 as a result of a determination that other communication platforms are still operational and/or that the outage is expected to be resolved within a threshold amount of time (e.g., within ten minutes).

In this example where controller 110 and/or maintenance server 140 determine to not send a proactive notification of a communication platform outage to all user devices 120 of an organization and/or network 150, controller 110 may monitor all affected communication platform instances 122. If controller 110 detects a message that would be impacted by this communication platform outage (such that this message regards the connectivity state of the communication platform as discussed herein), controller 110 may provide the indication of the connectivity state as discussed herein. For example, controller 110 may detect that the connectivity state indicates that user device 120A is able to communication with user device 120B and not able to communicate with user device 120C (e.g., as the outage state impacts the ability of communication platform instance 122C of user device 120C to receive and/or send messages). In response to this determination, controller 110 may provide no indication if controller 110 detects communication platform instance 122A messaging communication platform instance 122B (e.g., as this message does not regard the connectivity state of the outage). However, controller 110 may provide an indication of this outage in response to detecting a message within communication platform instance 122A being directed toward communication platform instance 122C.

In some examples, after providing an indication of the connectivity state to the user in response to detecting that the user was generating a message that regards the connectivity state, controller 110 may send details of this message and/or indication to maintenance server 140. For example, controller 110 may send details of the time at which the user generated the message, a respective user device 120 of user, or the like. In some examples, an IT department or AI functionality behind maintenance server 140 may escalate (e.g., devote more resources to resolving) an outage after a threshold number of messages and/or indications are detected and/or provided as discussed herein. Additionally, or alternatively, in some examples it may be easier to resolve an outage as a result of determining which users are messaging each other about it (e.g., such that controller 110 saving data of these messages and/or indications within maintenance server 140 may improve an ability of environment 100 to ultimately resolve outages).

Further, in some examples, even where controller 110 provides an indication of full connectivity to users, controller 110 may record this indication within maintenance server 140. In some examples, after a threshold number of indications within a threshold amount of time (e.g., if controller 110 provides at least one hundred indications of full connectivity over a given communication platform within five minutes), controller 110 may flag this as a possible false negative (e.g., an outage that is being falsely indicated by maintenance server 140 and/or controller 110 as full connectivity).

Figure 2:
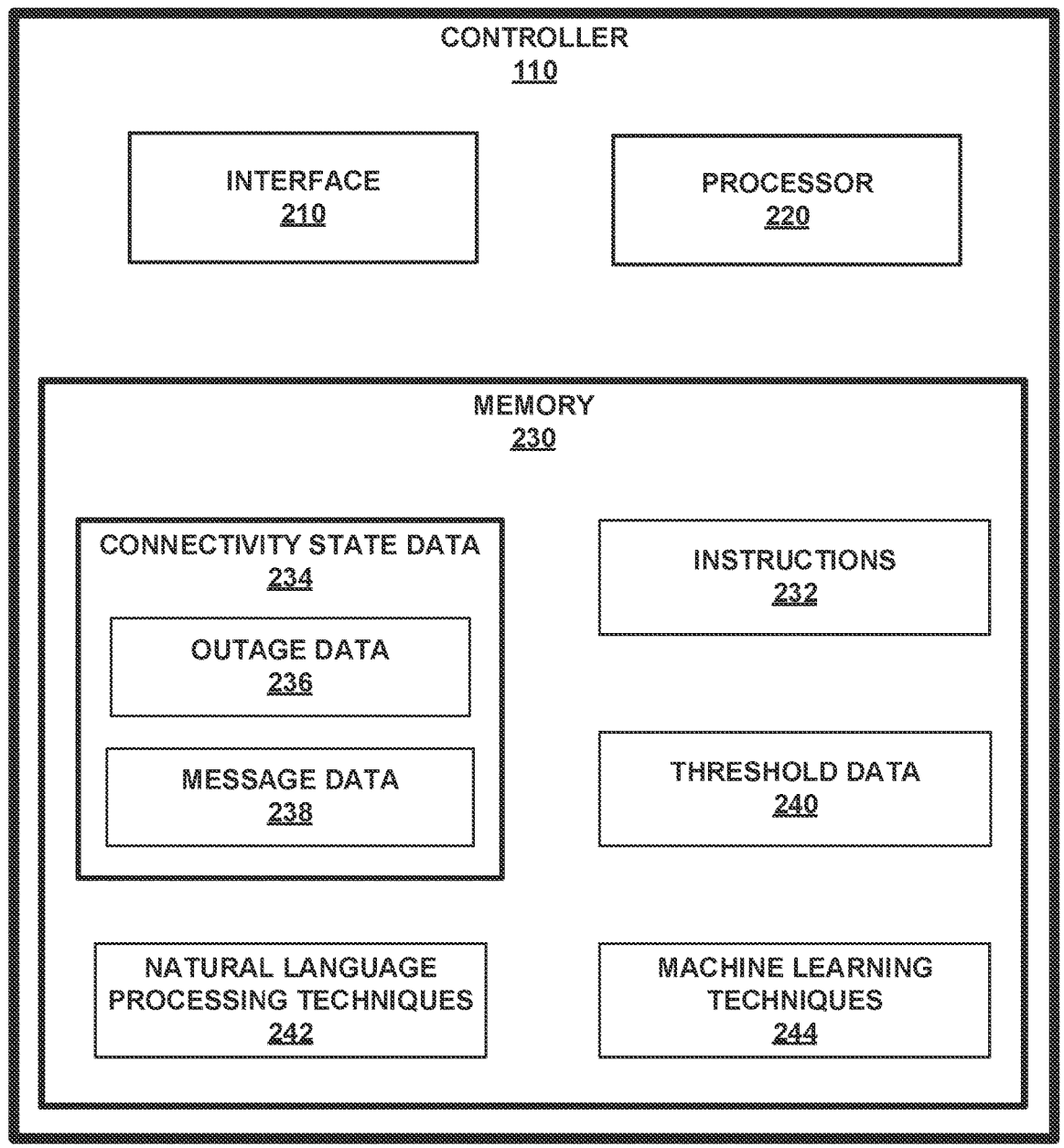
FIG. 2 depicts a conceptual box diagram of example components of the controller of FIG. 1.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, hosting servers 130, maintenance server(s) 140, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to manage connectivity states of communication platforms of user devices. Controller 110 may utilize processor 220 to thusly manage connectivity states. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage connectivity states accordingly.

Processor 220 may manage connectivity states of communication platforms according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage connectivity states as described herein according to instructions 232 of one or more applications (e.g., software applications) stored in memory 230 of controller 110.

In addition to instructions 232, in some examples gathered or predetermined data or techniques or the like as used by processor 220 to manage connectivity states as described herein may be stored within memory 230. For example, memory 230 may include information described above that is gathered from user devices 120 and/or maintenance servers 140. For example, as depicted in FIG. 2, memory 230 may include connectivity state data 234. Connectivity state data 234 may include information on a total number of user devices 120, communication platforms, networks 150, or the like of a relevant environment 100.

Connectivity state data 234 may further include outage data 236. Outage data 236 may include any data gathered from support tickets. For example, outage data 236 may include data on any reported or detected outages, including affected user devices 120 and/or communication platforms. This may include a date and/or time at which the outage was detected, a date and/or time at which the outage is expected to be resolved, and/or a date and/or time at which the outage is resolved. In some examples, connectivity state data 234 also includes message data 238. Message data 238 may include the content or meaning of messages sent between different users from different user devices 120. Controller 110 may only gather message data 238 in response to receiving an opt-in from the relevant users.

Further, memory 230 may include threshold data 240. Threshold data 240 may include thresholds that define what constitutes an outage. For example, threshold data 240 may detail a point at which a delayed message indicates an outage.

Memory 230 may further include NLP techniques 242. NLP techniques 242 can include, but are not limited to, semantic similarity, syntactic analysis, and ontological matching. For example, in some embodiments, processor 220 may be configured to analyze message data 238 as gathered from a first user to determine semantic features (e.g., word meanings, repeated words, keywords, etc.) and/or syntactic features (e.g., word structure, location of semantic features in headings, title, etc.) of this message data 238. Ontological matching could be used to map semantic and/or syntactic features to a particular concept. The concept can then be used to determine the topic of message data 238. In this same way, controller 110 may identify that a topic of one or more messages within message data 238 regards connectivity states as described herein.

Memory 230 may further include machine learning techniques 244 that controller 110 may use to improve a process of managing connectivity states as discussed herein over time. Machine learning techniques 244 can comprise algorithms or models that are generated by performing supervised, unsupervised, or semi-supervised training on a dataset, and subsequently applying the generated algorithm or model to manage connectivity states. Using these machine learning techniques 244, controller 110 may improve an ability of managing connectivity states over time. For example, controller 110 may analyze detected messages that regard connectivity states and provided indications (both of which controller 110 may store within maintenance server 140 and/or connectivity state data 234 as described above) to improve an ability of detecting outages and/or provided targeted connectivity state indications as described herein (e.g., by improving an ability to detect which messages regard connectivity states). Controller 110 may even learn different preferences of different users, such as whether some users want to receive an indication of a mild outage (e.g., that includes a slowdown that may slow messages more than a first threshold) and other users only want to receive indications of a severe outage (e.g., an outage that makes communication over a communication platform entirely impossible).

Machine learning techniques 244 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
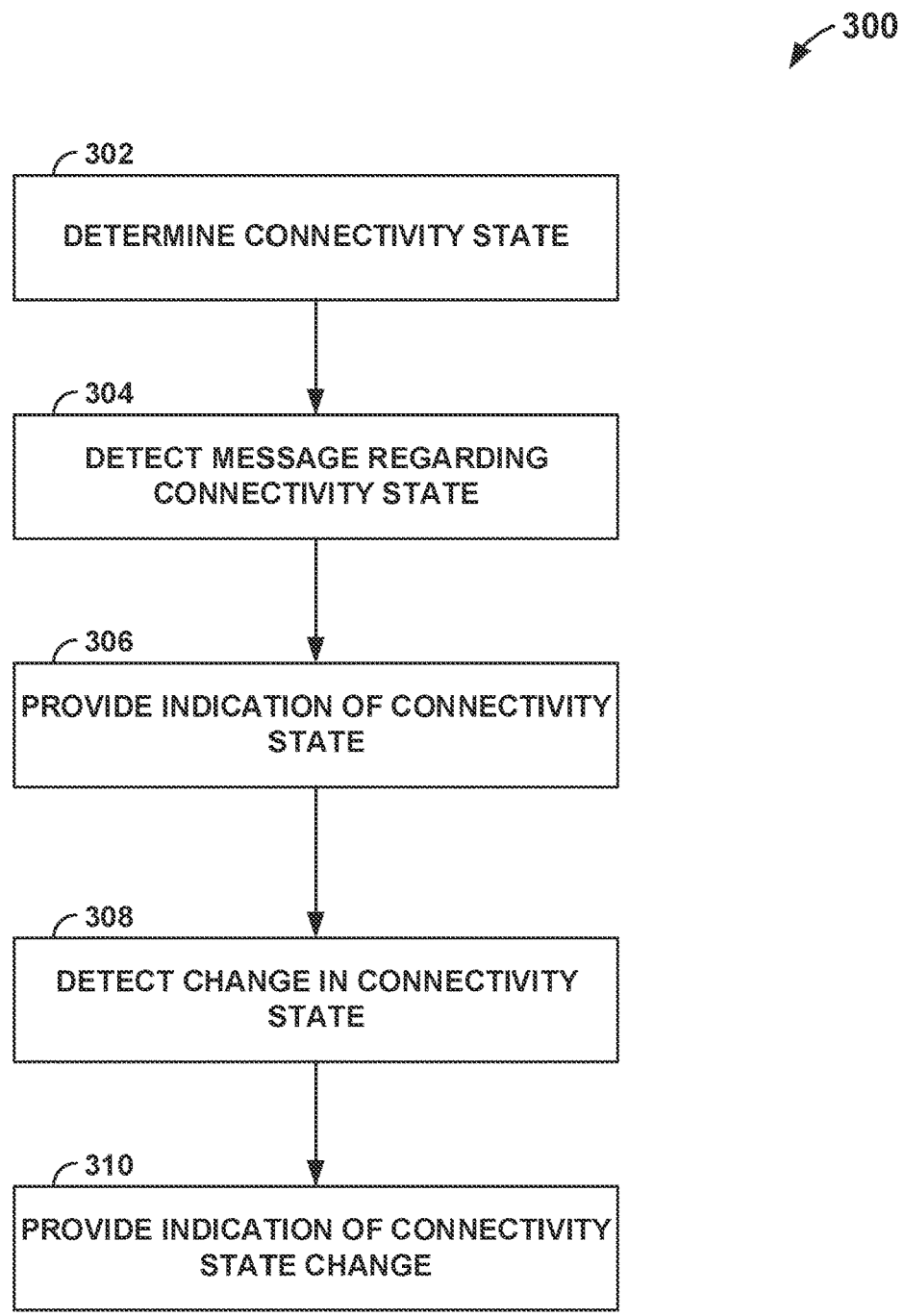
FIG. 3 depicts an example flowchart by which the controller of FIG. 1 may manage connectivity of a plurality of user devices to one or more communication platforms.

Using these components, controller 110 may manage connectivity states of one or more communication platforms across a plurality of user devices 120 as discussed herein. For example, controller 110 may manage connectivity states according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 determines a connectivity state of a communication platform across a plurality of user devices 120 (302). Controller 110 may determine this connectivity state by gathering or receiving information from maintenance server 140 that relates to this communication platform. Alternatively, or additionally, controller 110 may determine this connectivity state by itself detecting one or more statuses or errors within environment 100 that indicate this connectivity state.

Controller 110 detects a message regarding this connectivity state (304). This message may be between user devices 120 as sent and/or generated on one of communication platform instances 122. Controller 110 may use NLP techniques to determine that a topic of the content of the message regards the connectivity state. Alternatively, or additionally, controller 110 may analyze communication platform instances 122, user devices 120, and/or communication platforms of this message to determine that this message regards a connectivity state as a result of the message being likely to fail as a result of a detected outage.

Controller 110 provides an indication of this connectivity state (306). Controller 110 may provide this indication only to the user that sent the detected message. Controller 110 may provide this indication prior to the message being sent between user devices 120. This indication may provide some or all known details of this connectivity state. For example, if the connectivity state includes full connectivity, controller 110 may provide an indication that indicates such full connectivity. For another example, if the connectivity state includes an outage, the indication may include the communication platforms and/or user devices 120 that are impacted by the outage.

Controller 110 may detect a change in the connectivity state (308). For example, controller 110 may detect that an outage has been resolved, such that there is now full connectivity. For another example, controller 110 may detect that a communication platform over which a user had previously been looking to verify was fully operational has just experienced an outage. In response to detecting this change, controller 110 may provide a new indication that indicates this connectivity change (310). Controller 110 may provide this indication to only the user that sent the message regarding the connectivity state.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, by gathering information from a maintenance system that relates to connectivity, a connectivity state that includes:
      a first set of communication platforms that have full connectivity and a second set of communication platforms that are experiencing an outage; and
      a first set of user devices of a plurality of user devices that have full connectivity and a second set of user devices of the plurality of user devices that are experiencing the outage, wherein the second set of user devices includes a first and second device;
   detecting a message from the first user device and directed to the second user device regarding the connectivity state;
   transmitting details of the message to the maintenance system; and
   providing, to the first user device in response to detecting the message and prior to the first user device sending the message, an indication of the connectivity state that indicates the outage as impacting the second set of communication platforms and the second set of user devices and not impacting the first set of communication platforms and the first set of user devices.

2. The computer-implemented method of claim 1, further comprising:
   detecting a resolution to the outage, such that the connectivity state includes full connectivity;
   detecting a second message from the first user device and directed to the second user device regarding the connectivity state; and
   providing, to the first user device in response to detecting the second message, a second indication of the connectivity state that indicates the full connectivity.

3. The computer-implemented method of claim 1, further comprising:
   detecting a resolution to the outage;
   detecting another issue of the first user device that impacts the communication platform for the first user device;
   detecting a second message from the first user device and directed to the second user device regarding the connectivity state; and
   providing, to the first user device in response to detecting the second message, a second indication of the connectivity state that indicates the another issue.

4. A system comprising:
   a processor; and
   a memory in communication with the processor, the memory containing instructions that, when executed by the processor, cause the processor to:
      identify, by gathering information from a maintenance system that relates to connectivity, a connectivity state that includes:
         a first set of communication platforms that have full connectivity and a second set of communication platforms that are experiencing an outage; and
         a first set of user devices of a plurality of user devices that have full connectivity and a second set of user devices of the plurality of user devices that are experiencing the outage, wherein the second set of user devices includes a first and second device;
      detect a message from the first user device and directed to the second user device regarding the connectivity state;
      transmit details of the message to the maintenance system; and
      provide, to the first user device in response to detecting the message and prior to the first user device sending the message, an indication of the connectivity state that indicates the outage as impacting the second set of communication platforms and the second set of user devices and not impacting the first set of communication platforms and the first set of user devices.

5. The system of claim 4, the memory containing additional instructions that, when executed by the processor, further cause the processor to:
   detect a resolution to the outage, such that the connectivity state includes full connectivity;
   detect a second message from the first user device and directed to the second user device regarding the connectivity state; and
   provide, to the first user device in response to detecting the second message, a second indication of the connectivity state that indicates the full connectivity.

6. The system of claim 4, the memory containing additional instructions that, when executed by the processor, further cause the processor to:
   detect a resolution to the outage;
   detect another issue of the first user device that impacts the communication platform for the first user device;
   detect a second message from the first user device and directed to the second user device regarding the connectivity state; and
   provide, to the first user device in response to detecting the second message, a second indication of the connectivity state that indicates the another issue.

7. A computer program product, the computer program product comprising a computer readable storage medium having program instructions embodied therewith, the program instructions executable by a computer to cause the computer to:
   identify, by gathering information from a maintenance system that relates to connectivity, a connectivity state that includes:
      a first set of communication platforms that have full connectivity and a second set of communication platforms that are experiencing an outage; and
      a first set of user devices of a plurality of user devices that have full connectivity and a second set of user devices of the plurality of user devices that are experiencing the outage, wherein the second set of user devices includes a first and second device;
   detect a message from the first user device and directed to the second user device regarding the connectivity state;
   transmit details of the message to the maintenance system; and
   provide, to the first user device in response to detecting the message and prior to the first user device sending the message, an indication of the connectivity state that indicates the outage as impacting the second set of communication platforms and the second set of user devices and not impacting the first set of communication platforms and the first set of user devices.

* * * * *